Patented Mar. 13, 1945

2,371,235

UNITED STATES PATENT OFFICE 2,371,235

LIGHT COLORED FLEXIBLE LAC COMPOSITIONS

William Howlett Gardner, Bayside, and Henry Hall Bassford, Jr., Brooklyn, N. Y.

No Drawing. Application May 28, 1942, Serial No. 444,924

7 Claims. (Cl. 260—26)

This invention relates to a novel method for preparing fusible and soluble condensation products of bleached shellac by reaction with a polyhydric alcohol in the presence of another resin which acts as solvent, to the use of this process for preparing light-colored, wax-free, flexible lac compositions and to the preparation of aqueous varnishes containing them.

In our pending application, Serial No. 332,456, we pointed out that shellac and several other natural resins enjoy a variety of uses, particularly in their alkaline aqueous solutions, as hat binders, leather and shoe dressings, varnishes for paper, floor waxes, inks, adhesives and the like. We also explained that films from these aqueous shellac solutions are very brittle and are only temporarily plasticized by water soluble plasticizers, such as glycerine. We reported, however, that native shellac can be modified by means of certain chemical reactions, for example by reaction with at least 6.7% its weight of a polyhydric alcohol, so that it will yield upon evaporation of its alkaline aqueous solution, films of substantially permanent flexibility.

However, the objectionable color and wax impurities present in the alkaline solution of these natural shellac-polyhydric alcohol reaction products prohibits their widespread use. It is possible to bleach these products with sodium hydrochlorite but the operation is much more difficult than the usual shellac-bleaching process, since the alkali soaps of the modified lacs are not very soluble, and separate as gummy resinous masses following the addition of the bleach solution. Furthermore the preparation of a wax-free product by filtering the alkaline solution of the modified lac is commercially impracticable due to the large amount of unfilterable mucilaginous material formed during the reaction between the native shellac and the polyhydric alcohol. Finally, after purification the shellac polyhydric alcohol product is obtained as a wet gummy material which is difficult to dry or grind and is completely unsuitable for packaging or shipping.

It is not possible to prepare light-colored shellac derivatives suitable for use in aqueous alkaline solutions by reacting bleached shellac with polyhydric alcohols alone since in all cases the product is an infusible insoluble gel. The difference in behavior between bleached and native shellac may be ascribed to the fact that we are dealing with structurally different resins, which possess different acid numbers, different chemical composition and widely different rates of polymerization under heat.

We have now discovered that light-colored wax-free flexible resins ready for packaging, shipping or immediate use in aqueous varnish, can be prepared by reacting bleached refined shellac with polyhydric alcohols in the presence of another resin which acts as a mutual solvent for the shellac and the polyhydric alcohol. In this way the polymerization of the shellac is delayed, and soluble, flexible, fusible resins are obtained. Since the resin used as solvent possesses functionally active groups, it also enters into the reaction. This is advantageous since the solvent resin thus becomes an integral part of the reaction product and thus assumes the desirable qualities characteristic of shellac.

In accordance with our invention, a suitable resin, such as manila gum, rosin or rosin derivatives such as ester gum, or the polybasic acid obtained by condensing a terpene with maleic anhydride by means of the Diels-Alder procedure, or a mixture of two or more resins of the above types, is brought into reaction with shellac and a polyhydric alcohol, such as glycerine, mannitol, ethylene glycol, trimethylene glycol, or pentaerythritol or a mixture of one or more of the aforementioned polyhydric alcohols with a monohydric alcohol such as butyl or amyl alcohol, as an elevated temperature of at least 110° C. and under such conditions that the resin acts as a solvent for the shellac and the polyhydric alcohol. The reaction is preferably carried out in the presence of a catalyst, such as p-toluene sulfonic acid, which favors the formation of products having an acid number above about 40 mg. KOH/1 gm. which allows their being readily dissolved in aqueous alkaline media. Products of the type disclosed by Schmidt, U. S. Patent 1,845,- 198, which are prepared by heating alkylene oxides with resinous acid substances, contain practically no free acid groups and are insoluble in water and aqueous alkalies. It is probable that the alkylene oxides described react entirely with carboxyl groups. That is if shellac is represented as $(HO)_x$—R—COOH, then

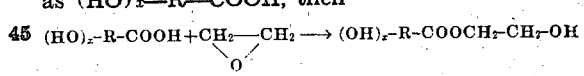

with the formation of esters. This would explain the completeness of the reaction as evidenced by Example 2 of the patent in which the acid number of an ester gum is reduced from 15 to 1.5 by reaction with ethylene oxide. It has been established, on the other hand, that in our process, a considerable proportion of the polyhydric alcohol condenses with the hydroxyl groups of the shellac to form ether linkages. In this way the carboxyl groups are left unesterified and serve as solubilizing groups for the resin produced.

The major considerations determining the relative proportions of polyhydric alcohol and shellac is the need for sufficient polyhydric alcohol to avoid gelation during the reaction, and sufficient to impart the desired plasticity and flexibility to the final product. It has been our experience that when less than 1 part of polyhydric alcohol is allowed to react with 15 parts of shellac, the result is invariably an insoluble, infusible gel. This can be explained readily on the basis of the law of mass action. Under the conditions suggested above, the concentration of shellac is so high that the main reaction takes place between shellac molecules, which quickly leads to the formation of a gel. If, on the other hand, larger proportions of polyhydric alcohol are employed, the main reaction takes place between the shellac and the polyhydric alcohol leading to fusible soluble resins which can be used for preparing aqueous varnishes.

Some of the products prepared may be dispersed directly in water, but in most cases, a small amount (usually about 10% based on the weight of resin) of an organic or inorganic alkali, such as ammonia, sodium carbonate, borax, sodium silicate, sodium phosphate, morpholine, triethanolamine, ethyl amine, pyridine and the like, is required to solubilize the resin and allow preparation of a clear light-colored aqueous varnish.

It is possible to employ the products above described as thermoplastic molding compounds. In this way the advantageous properties imparted by shellac resins is obtained and at the same time a light colored product may be secured. This is novel because the high polymerization rate of bleached shellac has heretofore militated against its use for such purposes.

In both the examples and claims, the term, "bleached shellac" is intended to include both wax-containing and refined bleached shellac, as well as any other lac, such as decolorized hard lac, in which the dark colored substances and dyestuff present in native shellac have been subjected to a bleaching process.

The following examples are illustrative of the instant invention without, however, limiting the same to any of the specific embodiments, amounts or conditions there recited.

*Example I*

Heat 50 g. of a Diels-Alder terpene maleic anhydride condensation product with 25 g. ethylene glycol for 23 minutes at 200° C. Then add simultaneously and uniformly 80 g. of refined bleached shellac and 10 g. glycerol. During the addition, which should take approximately 30 minutes, the mixture must be vigorously stirred and the temperature maintained at 180–190° C. At the end of this time the product is uniform and light brown in color. It is quite fluid and can be readily poured into molds or onto flat tins to cool and solidify. The product is readily soluble in dilute aqueous ammonia.

*Example II*

50 g. of a Diels-Alder terpene maleic anhydride condensation product are heated for 20 minutes at 200° C. with 25 g. ethylene glycol. The product, a clear thermoplastic resin is then cooled to 120° C. and 1 g. p-toluene sulfonic acid added and then 7.5 g. butyl alcohol, 7.5 g. glycerol and 75 gm. shellac are then dissolved in this resin, with stirring, and the uniform solution heated 30 minutes between 120 and 150° C. The resinous product is fusible and readily soluble in dilute aqueous ammonia.

Varnishes can be made by dissolving the bleached shellac-polyhydric alcohol resins, prepared in Examples 1 and 2 above, in dilute aqueous ammonia. If these varnishes are used to coat paper and metal strips, the resultant films may be dried and aged for one month at room temperature, without their adhesion and flexibility being materially affected. Similar films from aqueous alkaline shellac solutions although plasticized with glycerol or butyl carbitol, craze badly and become very brittle before the end of the aging period.

Having described our invention, what we claim and desire to secure by Letters Patent, is as follows:

1. A shellac product capable of yielding substantially flexible, light-colored films from its solutions in aqueous media resulting from the reaction of bleached shellac with a mixture of glycerol and butyl alcohol at a temperature of at least 110° C. in the presence of a resin produced by heating a Diels-Alder terpene-maleic anhydride condensation product with ethylene glycol, characterized as a mutual solvent for the components reacting.

2. An aqueous varnish containing a resin prepared in accordance with claim 1.

3. A shellac product capable of yielding light-colored, wax-free, substantially flexible films from its solution in aqueous media, resulting from the reaction of a dewaxed bleached shellac with a polyhydric alcohol at a temperature of at least 110° C. in the presence of a polyester which serves as a mutual solvent for the components, said polyester being produced by heating ethylene glycol with the resin acid resulting from the Diels-Alder condensation of a terpene with maleic anhydride.

4. An aqueous varnish containing the shellac product prepared in accordance with claim 3.

5. A shellac product capable of yielding substantially flexible films from its solutions in aqueous media resulting from the reaction of bleached shellac with a mixture of a polyhydric and a monohydric alcohol in the presence of a resin characterized as a mutual solvent for the components reacting and consisting of a Diels-Alder terpene maleic anhydride condensation product ethylene glycol ester.

6. A shellac product capable of yielding light-colored, wax-free, substantially flexible films from its solution in aqueous media, resulting from the reaction of hard lac with a polyhydric alcohol at a temperature of at least 110° C., in the presence of a polyester which serves as a mutual solvent for the components, said polyester being produced by heating ethylene glycol with the resin acid resulting from the Diels-Alder condensation of a terpene with maleic anhydride.

7. An aqueous varnish containing the shellac product prepared in accordance with claim 6.

WILLIAM HOWLETT GARDNER.
HENRY HALL BASSFORD, Jr.